(12) United States Patent
Al Salameh

(10) Patent No.: US 9,388,793 B2
(45) Date of Patent: Jul. 12, 2016

(54) VEHICLE WIND TURBINE SYSTEM

(71) Applicant: UMM AL-QURA UNIVERSITY, Makkah (SA)

(72) Inventor: Saleh Abdullah Al Salameh, Al Rass (SA)

(73) Assignee: UMM AL-QURA UNIVERSITY, Makkah (SA)

( * ) Notice: Subject to any disclaimer, the term of this patent is extended or adjusted under 35 U.S.C. 154(b) by 118 days.

(21) Appl. No.: 14/218,874

(22) Filed: Mar. 18, 2014

(65) Prior Publication Data
US 2015/0267552 A1    Sep. 24, 2015

(51) Int. Cl.
*F01D 15/10*    (2006.01)
*F03D 9/00*    (2016.01)

(52) U.S. Cl.
CPC . *F03D 9/00* (2013.01); *Y02E 10/72* (2013.01); *Y02T 10/90* (2013.01)

(58) Field of Classification Search
CPC .................................. F01D 15/10; F02D 1/20
USPC ............................................................ 290/52
See application file for complete search history.

(56) References Cited

U.S. PATENT DOCUMENTS

| | | | | |
|---|---|---|---|---|
| 3,513,326 A * | 5/1970 | Potts | ...................... | B60K 16/00 180/2.2 |
| 5,760,515 A | 6/1998 | Burns | | |
| 6,700,215 B2 | 3/2004 | Wu | | |
| 6,765,324 B1 * | 7/2004 | Chien | .................... | B60Q 1/326 180/2.2 |
| 7,646,106 B2 | 1/2010 | Thompson | | |
| 8,344,538 B2 | 1/2013 | Desplats et al. | | |
| 2012/0187695 A1 * | 7/2012 | Desplats | ................... | F03D 1/02 290/55 |
| 2013/0146372 A1 * | 6/2013 | Cunico | ................... | B60L 8/006 180/65.1 |
| 2013/0306389 A1 * | 11/2013 | Penev | ..................... | B60L 8/003 180/165 |
| 2014/0099201 A1 * | 4/2014 | Thomazios | ............... | F03D 9/00 416/1 |
| 2015/0260154 A1 * | 9/2015 | Thomazios | ............. | F03D 1/025 416/124 |

FOREIGN PATENT DOCUMENTS

KR         20130062741 A   *   6/2013
TW            201103232 A        1/2011

* cited by examiner

*Primary Examiner* — Tulsidas C Patel
*Assistant Examiner* — Sean Gugger
(74) *Attorney, Agent, or Firm* — Richard C. Litman

(57) ABSTRACT

The vehicle wind turbine system includes at least one wheel, the at least one wheel having at least one fan blade adapted to generate airflow from the rotation of the at least one wheel, at least one turbine blade coupled to a corresponding shaft, the at least one turbine blade receiving the generated airflow from the at least one fan blade to rotate the at least one turbine blade, the rotation of the at least one turbine blade rotating the corresponding shaft to generate mechanical energy, and at least one electrical generator respectively in communication with the corresponding shaft, the at least one electrical generator to generate electrical power from the mechanical energy generated by the rotation of the corresponding at least one turbine blade, the generated mechanical energy driving the at least one electrical generator to generate the electrical power for use by a vehicle or to be stored.

4 Claims, 5 Drawing Sheets

VEHICLE WIND TURBINE SYSTEM

BACKGROUND OF THE INVENTION

1. Field of the Invention

The present invention relates to electrical power generation, and particularly to a system for generating electrical power by the rotational movement of wheels positioned on vehicles, such as cars, trains, bicycles, and motorcycles.

2. Description of the Related Art

It has been a goal of automotive manufacturers and designers to make driving more economical, by finding ways to conserve fossil fuels, and to decrease the carbon footprint created by such vehicles, by finding ways to reduce emissions from combustion products. Systems that have been developed by the automobile industry to take advantage of kinetic energy, wind resistance, and solar radiation to make driving more economical and more environmentally friendly, however, have a variety of drawbacks. Kinetic systems, for example, include an electric generator and a battery storage for recovery of energy as the vehicle decelerates. The energy that is recovered using this method is created by energy compression and vehicle braking and is stored in batteries. However, the energy produced using kinetic energy systems, is limited and not completely recoverable due in part to insufficient battery capacity. The systems designed to recover energy from shock absorbers also have significant drawbacks, because, like the energy produced by the kinetic systems, the energy produced by the shock absorbers is not completely recoverable due to compression heating. Solar power energy recovery systems are also inefficient due to the insufficient battery capacity. Further, systems developed to recover energy from wind are inefficient since they typically increase the drag on the vehicles; thereby, increasing the amount of energy needed to power the vehicle and, in turn, increasing the amount of fuel consumed. Such system can also adversely affect the aerodynamic shapes of the vehicles, which are intended to reduce drag and can make the vehicles more fuel efficient and environmentally friendly.

Thus, a vehicle wheel fan and wind turbine system addressing the aforementioned problems is desired.

SUMMARY OF THE INVENTION

A vehicle wind turbine system is provided that may produce sufficient electrical power to power a vehicle without the need for fossil fuels. The vehicle wind turbine system may include at least one wheel having at least one fan blade adapted to generate airflow from the rotation of the at least one wheel, at least one turbine blade coupled to a corresponding shaft, the at least one turbine blade receiving the generated airflow from the at least one fan blade to rotate the at least one turbine blade, the rotation of the at least one turbine blade rotating the corresponding shaft to generate mechanical energy, and at least one electrical generator respectively in communication with the corresponding shaft, the at least one electrical generator to generate electrical power from the mechanical energy generated by the rotation of the corresponding at least one turbine blade, the generated mechanical energy driving the at least one electrical generator to generate the electrical power. Once the electrical power is generated it can be used by the vehicle engine or stored in an energy storage device, such as a battery, for example, for later use.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
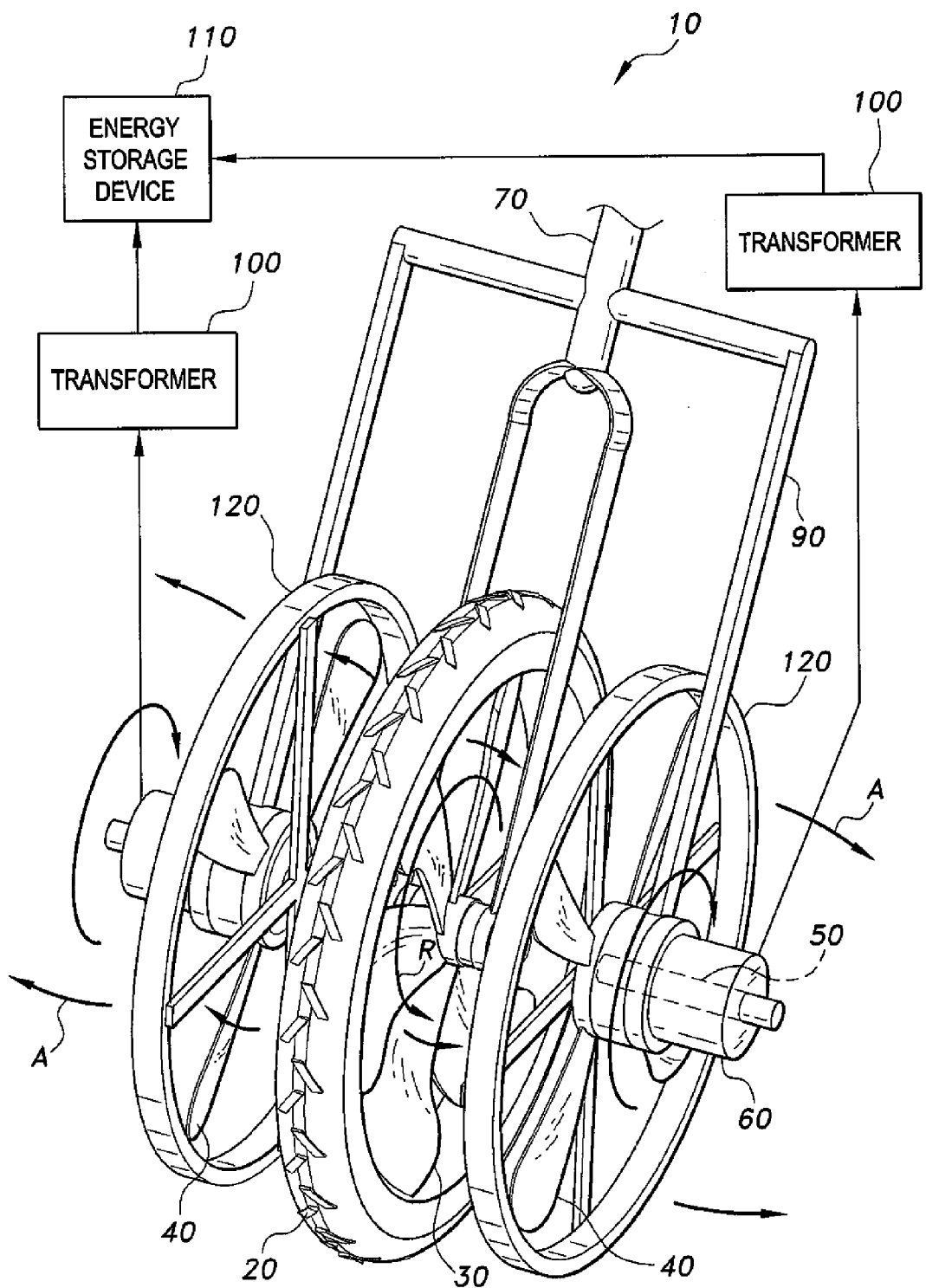
FIG. 1 is a front, perspective view of an embodiment of a vehicle wind turbine system according to the present invention, illustrating its various components.
Figure 2:
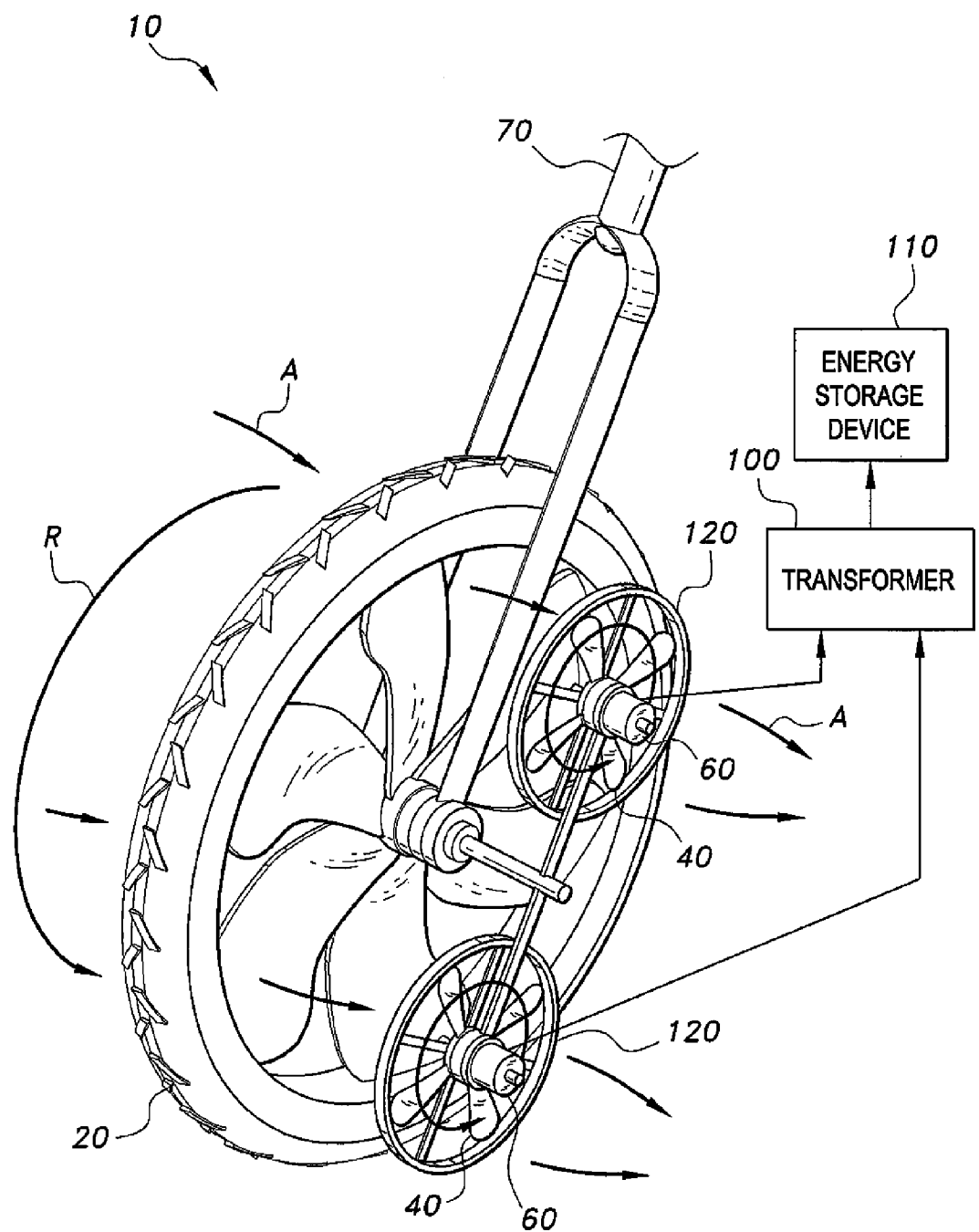
FIG. 2 is a front perspective view of an embodiment of a vehicle wind turbine system according to the present invention, including a plurality of generators.
Figure 3:
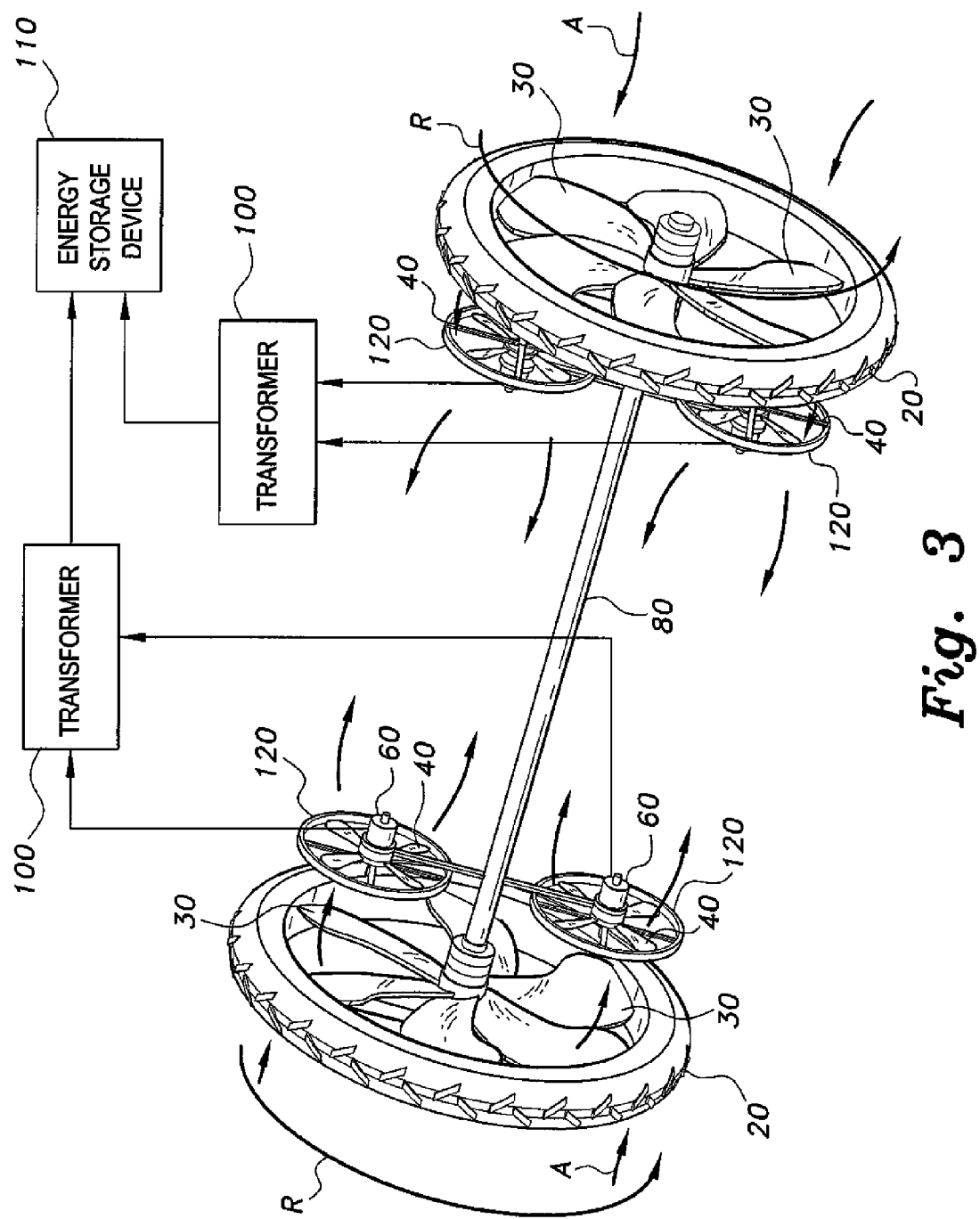
FIG. 3 is a front perspective view of an embodiment of a vehicle wind turbine system according to the present invention, including a plurality of wheels and a plurality of generators.

Referring to FIGS. 1-3, the vehicle wind turbine system 10 includes at least one wheel 20, the at least one wheel 20 having at least one fan blade 30 adapted to generate airflow A from the rotation R of the at least one wheel 20, at least one turbine blade 40 coupled to a corresponding shaft 50. The at least one turbine blade 40 rotates upon receiving the generated airflow A from the at least one fan blade 30. The rotation R of the at least one turbine blade 40 rotates the corresponding shaft 50 to generate mechanical energy. The vehicle wind turbine system includes at least one electrical generator 60 respectively in communication with the corresponding shaft 50, the at least one electrical generator 60 to generate electrical power from the mechanical energy generated by the rotation R of the corresponding at least one turbine blade 40. The generated mechanical energy drives the at least one electrical generator 60 to generate the electrical power, which is sent through a transformer 100, such as a step-up transformer, for example, so that the electrical power can be stored in the energy storage device 110, such as a battery.

The design of the at least one wheel 20 can vary depending on the purpose of the wheel. It is to be understood that the system 10 is not limited to a particular type of wheel. The system 10 can be adapted to work with wheels of every-day vehicles, wheels for racing vehicles, as well as wheels for off-roading vehicles and stationary vehicles (e.g., stationary bicycles in which the at least one wheel 20 rotates relative to the stationary vehicle when the user pedals). The wheel 20 can be of any suitable diameter and weight. For example, the at least one wheel 20 may have a diameter of about 18 inches and a weight of 27 pounds, although the diameter and weight of the at least one wheel 20 should not be construed in a limited sense. The at least one wheel can be supported on a frame 70 or by an axle 80.

The at least one fan blade 30 is adapted to generate airflow A from the rotation R of the at least one wheel 20. The at least one fan blade 30 can be of any suitable size. For example, the at least one fan blade 30 may have a side with a width of about 6 inches and a side with a length of about 6 inches, although the size of the at least one fan blade 30 should not be construed in a limited sense. The corners of the at least one fan blade 30 can be of various shapes, such as rounded corners or corners of a generally rounded shape. The at least one fan blade 30 can be formed of any suitable material, such as fiberglass, plastic, or aluminum, for example. One of the main factors in determining the type, size, and material of the at least one fan blade 30 to be used by the system 10 will be the type of wheel 20 on which the system 10 will be used. For example, a system 10 adapted to be used on a wheel 20 with a larger diameter, such as for a truck, will have fan blades of a different size, type, and material than a system 10 being adapted work on a smaller wheel 20, such as for a car or a bicycle, for example.

The design and the pitch of the at least one fan blade 30 can also be impacted by the direction of the wind. For example, if the wheel is rotating in a forward direction, the direction of the majority of the wind will come from the front of the wheel 20 since it is being created as a result of the forward rotation R of the wheel 20. In this example, the at least one fan blade 30 positioned on the at least one wheel 20, therefore, may not be flush against the side of the at least one wheel 20. Instead, the at least one fan blade 30 may protrude from the side of the at least one wheel 20 so that the at least one fan blade 30 can capture the wind being created by the forward motion of the wheel 20. It is also contemplated that the wind can be generated by a wheel rotating in reverse. It is, however, to be appreciated that wind can come from any number of directions, such as from the front, as well as from the rear, or from either side of the wheel 20. It is preferable that the at least one fan blade 30, therefore, be designed so as to not only capture high-velocity wind, from whichever direction it comes, but also to direct the airflow A toward the at least one turbine blade 40 coupled to the corresponding shaft 50 being in communication with the electric generator 60.

It is also contemplated that at times there can be significant crosswind despite the forward movement of the wheel 20. In order to compensate for the crosswind, the at least one fan blade 30 can be designed to catch the crosswind and direct the generated airflow A from the movement of the at least one wheel 20 toward the at least one turbine blade 40 coupled to a corresponding shaft 50. The at least one turbine blade 40 receives the generated airflow A from the at least one fan blade 30 to rotate the at least one turbine blade 40. The rotation R of the at least one turbine blade 40 rotates the corresponding shaft 50 to generate mechanical energy.

As shown in FIG. 1, the at least one turbine blade 40 can be positioned in a coaxial arrangement with the at least one wheel 20. The at least one wheel 20 can be supported on a frame 70 and the at least one turbine blade 40 can be supported by a supporting member 90 in conjunction with the frame 70. The system 10 can include at least one guard 120 for the at least one turbine blade 40. The at least one turbine blade 40 can include a plurality of turbine blades respectively positioned adjacent opposing sides of a corresponding wheel 20, as illustrated in FIG. 1. As illustrated in FIG. 3, the at least one turbine blade 40 can be positioned adjacent a side of a corresponding wheel 20 with respect to an axis 80 passing through the corresponding at least one wheel 20. The at least one turbine blade 40 can include a plurality of turbine blades respectively positioned adjacent a same side of a corresponding wheel 20, as illustrated in FIGS. 2 and 3. For example, a plurality of turbine blades may be adjacent a same side of two adjacent wheels, and in facing relation (FIG. 3). Regardless of the positioning of the at least one turbine blade 40, it is preferable that the at least one turbine blade 40 be closely positioned relative to the at least one wheel 20 and in a coaxial arrangement relative to a corresponding shaft 50, so as to produce rotational movement of the corresponding shaft 50 coupled to the electrical generator 60 and to generate mechanical energy. The mechanical energy can be passed through a transformer 100 and stored in a storage device 110, such as a battery, for example.

The at least one turbine blade 40 can be of any suitable size. For example, at least one turbine blade 40 may have a side with a width of about 6 inches, and a side with a length of about 6 inches, although the size of the at least one turbine blade 40 should not be construed in a limited sense. The corners of the at least one turbine blade 40 can be of various shapes, such as rounded corners or corners of a generally rounded shape. The at least one turbine blade 40 can be formed of any suitable material, such as fiberglass, plastic or aluminum, for example.

Figure 5:
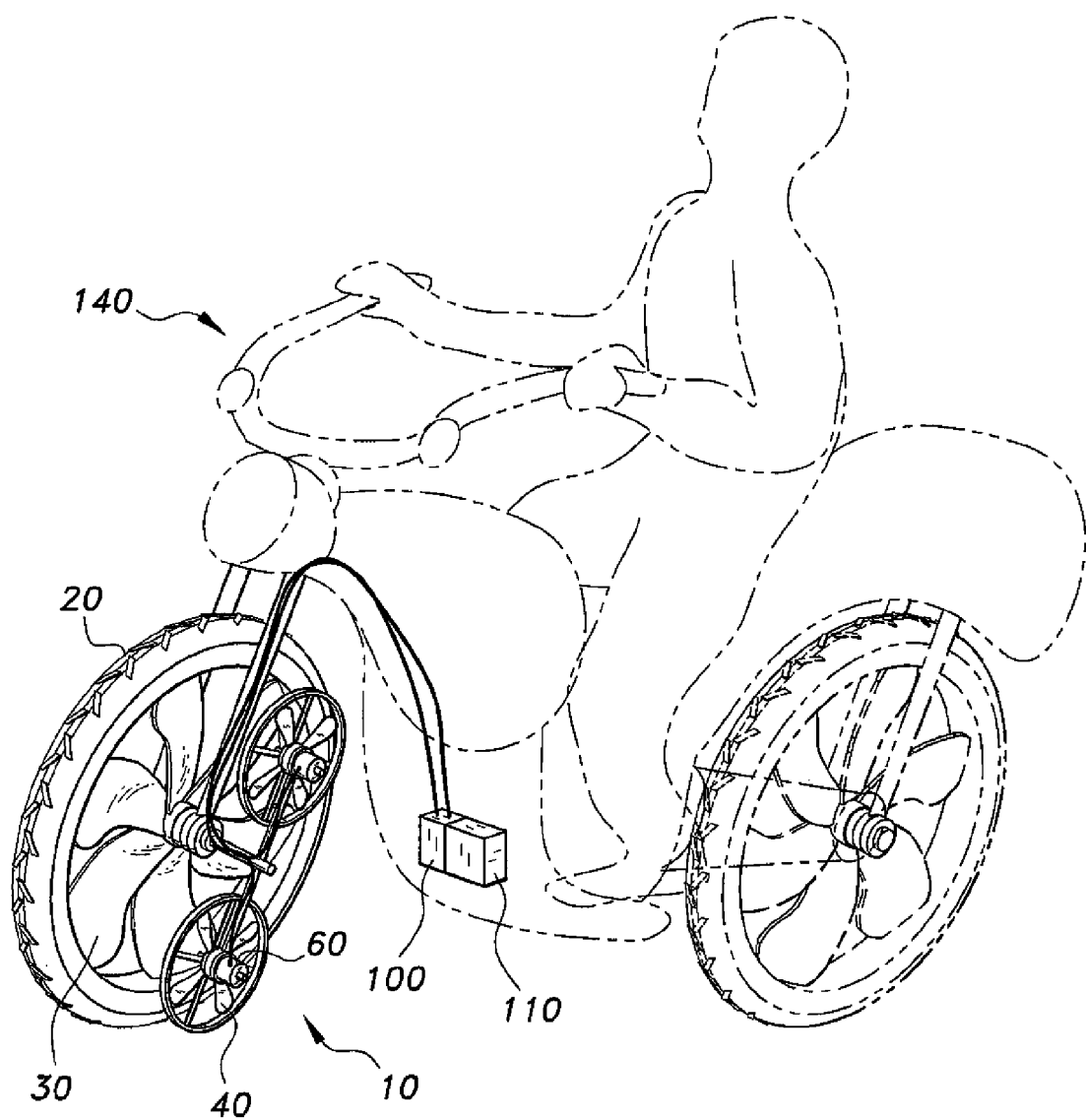
FIG. 5 is a front perspective view of an embodiment of a vehicle wind turbine system according to the present invention, including a vehicle.

Referring to FIG. 5, the wind turbine system 10 may include a vehicle 140, such as a motorcycle, at least one wheel 20 installed on the vehicle 140, the at least one wheel 20 having at least one fan blade 30 adapted to generate airflow A from the rotation R of the at least one wheel 20, at least one turbine blade 40 coupled to a corresponding shaft 50, at least one electrical generator 60 respectively in communication with the corresponding shaft 50, a transformer 100, and an energy storage device 110. The at least one turbine blade 40 receives the generated airflow A from the at least one fan blade 30 to rotate the at least one turbine blade 40. The rotation R of the at least one turbine blade 40 rotates the corresponding shaft 50 to generate mechanical energy. The at least one electrical generator 60 generates electrical power from the mechanical energy generated by the rotation R of the corresponding at least one turbine blade 40. The generated mechanical energy drives the at least one electrical generator 60 to generate the electrical power, preferably through a direct drive mechanism.

Referring to FIGS. 1-4, in operation, as the rotation R of the at least one wheel 20 having the at least one fan blade 30 generates airflow A, the at least one fan blade 30 directs the airflow A towards the at least one turbine blade 40 installed on the at least one wheel 20 or closely positioned relative to the at least one wheel 20 to be able receive the airflow A produced by the forward motion of the at least one wheel 20 and any airflow A produced by potential crosswinds. As the airflow A passes over the at least one turbine blade 40, the airflow A creates a lift, which causes the at least one turbine blade 40 to turn. As the at least one turbine blade 40 begins to rotate R, the at least one turbine blade 40, which enables the rotation R of the corresponding shaft 50 coupled to the electrical generator 60 and enables the generator to produce electrical power, preferably using a direct drive mechanism. Alternatively, the system 10 can utilize a gearbox mechanism. The electrical power from the electrical generator 60 can pass through a transformer 100 to an energy storage device 110, such as a battery, for example, for later use.

Figure 4:
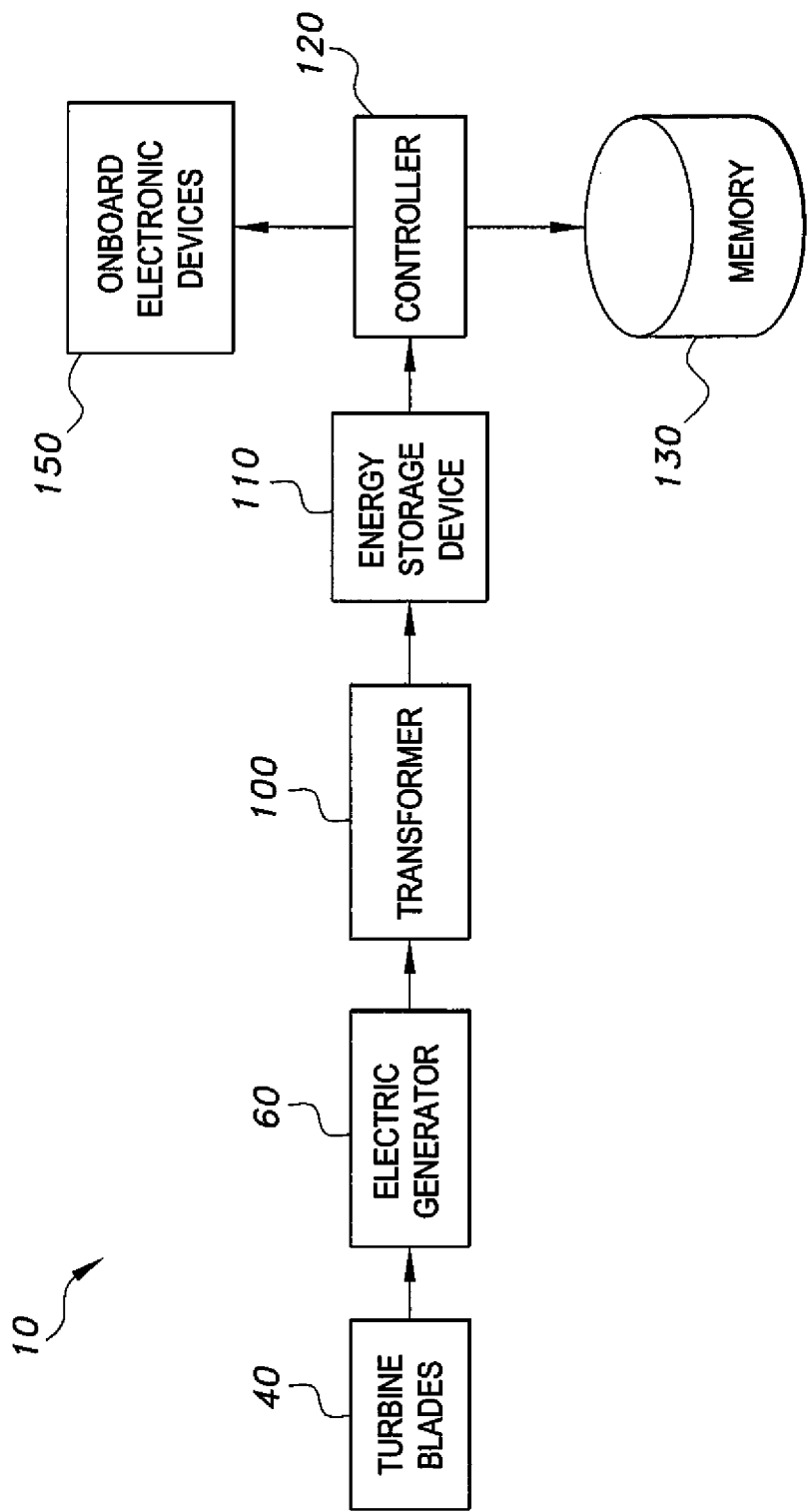
FIG. 4 is a flow chart illustrating a vehicle wind turbine system according to the present invention.

Referring to FIG. 4, data from the energy storage device 110 can be sent to the control unit 120 which can be associated with on board electrical devices 150, such as AM/FM radio, navigation unit, and air conditioning unit. The control unit 120, can also be associated with a memory 130 such as to store data and information, as well as program(s) or instructions for implementing operation of the system 10. The memory 130 can be any suitable type of computer readable and programmable memory, such as non-transitory computer readable media, random access memory (RAM) or read only memory (ROM), for example.

It is to be understood that the present invention is not limited to the embodiments described above, but encompasses any and all embodiments within the scope of the following claims.

I claim:

1. A vehicle wind turbine system, comprising:
   at least one wheel, each of the at least one wheel having at least one fan blade bounded therein, the fan blade adapted to generate airflow from the rotation of the at least one wheel;
   a plurality of turbine blades respectively positioned adjacent a same side of the corresponding at least one wheel;
   wherein the plurality of turbine blades are at least diametrically disposed about the same side of the wheel;
   each one of the plurality of turbine blades coupled to a corresponding shaft, each one of the plurality turbine blades receiving the generated airflow from the at least one fan blade to rotate each one of the plurality of turbine blades, the rotation of each one of the plurality of turbine blades rotating the corresponding shaft to generate mechanical energy; and
   at least one electrical generator respectively in communication with the corresponding shaft being driven directly, the at least one electrical generator generating electrical power from the mechanical energy generated by the rotation of the corresponding at least one turbine blade, the generated mechanical energy driving the at least one electrical generator to generate the electrical power;
   wherein the at least one fan blade and the at least one turbine blade are formed of a material selected from the group consisting of fiberglass, plastic, and aluminum.

2. The vehicle wind turbine system according to claim 1, wherein the at least one wheel is supported on a frame and each one of the plurality of turbine blades are supported by a supporting member in conjunction with the frame.

3. The vehicle wind turbine system according to claim 1, wherein the at least one wheel is installed on a vehicle, wherein rotation of the at least one wheel rotates a corresponding at least one fan blade to provide the generated airflow.

4. The vehicle wind turbine system according to claim 3, wherein the vehicle is stationary, and the at least one wheel rotates relative to the stationary vehicle.

* * * * *